United States Patent [19]

Barnes

[11] Patent Number: 5,793,803
[45] Date of Patent: Aug. 11, 1998

[54] UNDERRECOVERY SYSTEM AND METHOD FOR BLOCK PROCESSING MODEMS

[75] Inventor: Thomas J. Barnes, Hillsboro, Oreg.

[73] Assignee: Intel Corporation, Santa Clara, Calif.

[21] Appl. No.: 535,898

[22] Filed: Sep. 28, 1995

[51] Int. Cl.$^6$ ............................................. H04B 1/38
[52] U.S. Cl. .................... 375/222; 375/219; 375/357; 370/230; 370/236
[58] Field of Search ....................... 375/219, 220, 375/222, 225, 357, 356; 370/506, 505, 294, 282, 230, 235, 236; 379/93, 59

[56] References Cited

U.S. PATENT DOCUMENTS

| | | | |
|---|---|---|---|
| 4,697,281 | 9/1987 | O'Sullivan | 379/59 |
| 5,444,704 | 8/1995 | Henderson et al. | 375/222 |
| 5,450,530 | 9/1995 | Snyder et al. | 375/222 |

*Primary Examiner*—Wellington Chin
*Assistant Examiner*—Conguan Tran
*Attorney, Agent, or Firm*—Blakely, Sokoloff, Taylor & Zafman

[57] ABSTRACT

A system for detecting an underrun condition in a block processing modem and upon detection retransmitting previously transmitted data or a fixed pattern of data. The system has a register or memory location that counts the symbols in a buffer located between the microprocessor and the DSP. As a symbol is added to the buffer by the microprocessor, the register is incremented. As a block of symbols is taken from the buffer by the DSP, the register decremented. Thus at any point in time, the register contains a count of the symbols in the buffer. When The DSP is ready for a next block of symbols, logic in the DSP compares the symbol count in the register and if the count is too low for the block of symbols to be passed to the DSP, the DSP itself sends either the previous set of data or a fixed pattern of data to the AFE. The error detection software operating in the software layer above the data pump detects an error and requests a retransmission.

30 Claims, 3 Drawing Sheets

UNDERRECOVERY SYSTEM AND METHOD FOR BLOCK PROCESSING MODEMS

BACKGROUND OF THE INVENTION

1. Field of the Invention

The present invention relates to block mode processing modems. More particularly, it relates to a system and method for detecting an underrun condition in a block processing modem and upon detection retransmitting previously transmitted data or a fixed pattern of data to maintain the network connection.

2. Description of the Prior Art

FIG. 1 is a high level block diagram of a high speed modem. Referring to FIG. 1, a host computer 10 is connected to a modem 12 which is in turn connected to telephone network 14. Modem 12 consists of a data access device ("DAA") 16 which is a telephone company specified interface that isolates the network from peripheral devices. DAA 16 is connected to an analog front end AFE ("AFE") 18 which is the analog to digital interface of modem 12. AFE 18 is connected to digital signal processor ("DSP") 20 which contains the digital signal processing functions of modem 12. The functions performed by AFE 18 and DSP 20 together are sometimes referred to as a data pump. DSP 20 is connected to microprocessor 22 which contains the protocol, error checking and compression functions of modem 12 as well as general supervisory functions. All components are dedicated.

Analog data is converted to digital data by sampling the analog wave form. A point on an analog signal is represented in the digital domain by a digital word or string of digital data typically 16 or 18 bits wide. Thus an analog signal is represented by a sequence of samples. The resolution or fidelity by which the analog signal can be represented in the digital domain is a function of the frequency with which the samples are taken and the number of bits with which their amplitude and phase are captured by the digital sample.

Referring again to FIG. 1, in operation, an analog signal comes in from telephone network 14 through DAA 16 to AFE 18. In AFE 18, the analog signal is sampled. The sample, typically consisting of a 16 bit binary word is transferred in parallel from AFE 18 to DSP 20. This transmission is typically synchronous. The digital signal processing functions of DSP 20 are many, but are well known in the art. Among the functions of DSP 20 is a process that converts the stream of samples to a stream of symbols when data is being received and visa versa when data is being transmitted. A symbol is a fixed number of bits of data as specified by the modulation scheme being used. Symbols are passed from DSP 20 to microprocessor 22 where they are further processed for error correction and for data compression.

The sampling process takes place at a frequency of a few thousand samples per second. In contrast, the clock speed of even a slow DSP 20 is likely to be several million hz. Thus the arrival of a sample at DSP 20 from AFE 18 is relatively infrequent event. And processing samples takes a small fraction of the total processing time available to DSP 20. Thus a considerable amount of processing time goes unused if DSP 20 only processes samples. Designers have taken advantage of the unused DSP processing time to have the DSP perform additional tasks such as voice compression for digital simultaneous voice and data transmission or cellular telephone functions. However, once DSP 20 is performing tasks in addition to its principal task of sample processing, a method of sharing the processing power of DSP 20 must be implemented.

It has been well established that sharing computing resources in a real time system is most efficiently accomplished by the use of interrupt schemes. An interrupt scheme is used to tell DSP 20 that a new sample or symbol is available for processing. When interrupts are used, a certain amount of overhead is incurred to process the interrupts. For example registers and flags must be saved and cleared. The overhead directly affects performance. Thus, it is always an objective to minimize overhead.

FIG. 2 is a time line which shows an early approach to the use of interrupts. In FIG. 2, horizontal line 24 represents all of the processing time available to DSP 20. Time periods 26 represent the time taken to process a sample. Time periods 28 represent processing devoted to other tasks. Each time that a sample or symbol is received and each time that the processor finishes processing a sample or symbol, an interrupt occurs. With this approach, the frequency of interrupts is high.

In order to reduce the overhead caused by frequent interrupts, buffers are added to collect multiple samples or symbols for a predetermined period of time. This time is called a block period and the data collected during this period is called a block. When a block of samples has been collected in the buffer, an interrupt is sent to DSP 20, and the entire block of samples is transferred to DSP 20 where it is processed. Since it takes longer to collect a block of samples than to collect one sample, secondary tasks can run longer without experiencing an interrupt. This general approach is known as block mode processing and is a technique well known in the art. The advantages of block mode processing are that it reduces interrupts and associated interrupt overhead to the DSP processor. A collateral benefit is that it reduces deadline constraints on microprocessor 22 which allows for the use of slower and therefore less expensive microprocessors. Alternatively, it allows a heavier average CPU load on microprocessor 22.

FIG. 3 is a block diagram illustrating the system enhancements required to perform block processing. Referring to FIG. 3, buffer 30 is inserted between microprocessor 22 and DSP 20 in the transmit path of modem 12. Buffer 32 is inserted between DSP 20 and AFE 18 in the transmit path. In the receive path of modem 12, buffer 34 is inserted between AFE 18 and DSP 20, and buffer 36 is inserted between DSP 20 and microprocessor 22. Buffers 32 and 34 store samples. They may store any number of samples. Current practice uses block sizes of up to 256 samples. Buffers 30 and 36 store symbols. The rate of transfer of samples by buffers 32 and 34 may be different than the transfer of symbols by buffers 30 and 36. The sample data in buffer 32 is transmitted through AFE 18 at a very slow rate, for example 10 kilohertz.

In operation in the receive path, when buffer 32 is empty, AFE 18 signals DSP 20 that it needs a new block of sample data. In the transmit path, when buffer 30 is empty, DSP 20 signals microprocessor 22 that it needs a new block of symbol data.

A problem with this design occurs if microprocessor 22 is unable to supply a block of symbols when register 30 is empty and calls for the next block of data. If microprocessor 22 misses its deadline for supplying such data, there are no symbols for DSP 20 to process. This is known as an under run condition. If an under run condition occurs, no samples are supplied to buffer 32 and no samples are transmitted to the digital to analog converter of AFE 18. And if no data is supplied to AFE 18, no carrier signal is supplied to DAA 16 and thus to telephone network 14. When this occurs, the receiving modem hangs up the connection and the data transmission ceases. This event drastically reduces data throughput of the modem since once a connection is broken, it takes a long time to redial and reestablish the connection which includes training the various heuristic functions that modern modems use to compensate for communication channel impairments.

In the past this problem has been avoided by requiring microprocessor 22 to have sufficient computing power relative to DSP 20 so that the circumstance could not possibly arise. The problem with this approach is that it requires a relatively more expensive microprocessor or requires that the load on the microprocessor be reduced so that there is no possibility that the deadline is missed.

SUMMARY OF THE INVENTION

This problem is resolved by the present invention in a block processing modem which has command and protocol tasks communicating with mod/demod tasks which in turn communicate with an AFE. Temporary storage is provided which performs the function of temporarily storing data being transferred between the command and protocol tasks and the mod/demod tasks. A counter is provided which communicates with the command and control protocol tasks and the mod/demod tasks for providing an indication that the amount of data stored in the temporary storage means is below a predetermined level. Finally, there are means associated with the mod/demod tasks which respond to the counter indication and cause the mod/demod tasks to provide data output to the AFE upon receipt of the indication.

The first step of the method of the present invention is to determine the quantity of data in the data storage means. The next step is to compare the quantity with a predetermined value. If the quantity exceeds the predetermined value, the next step is to supply the contents of the data storage means to the AFE. If however the quantity is less than the predetermined value, the next step is to supply dummy data to the AFE.

BRIEF DESCRIPTION OF THE DRAWING

The preferred embodiments of the invention will now be described in connection with the drawing wherein.

DESCRIPTION OF THE PREFERRED EMBODIMENT

The present invention solves the under run condition by adding logic to the system and defining a sequence of events that occurs if a deadline is missed by microprocessor 22. If the deadline is missed and DSP 20 finds that buffer 30 has insufficient data, DSP 20 itself will transmit a predetermined pattern of data for the duration of the current block period. The result of this action is that the continuity of the analog signal is not broken, and therefore, the data channel is not lost with the resultant large loss in data throughput. The error correction schemes that reside in microprocessor 22, logically the modem functions above the data pump layer, will identify the data as an error and request retransmission.

Figure 4:
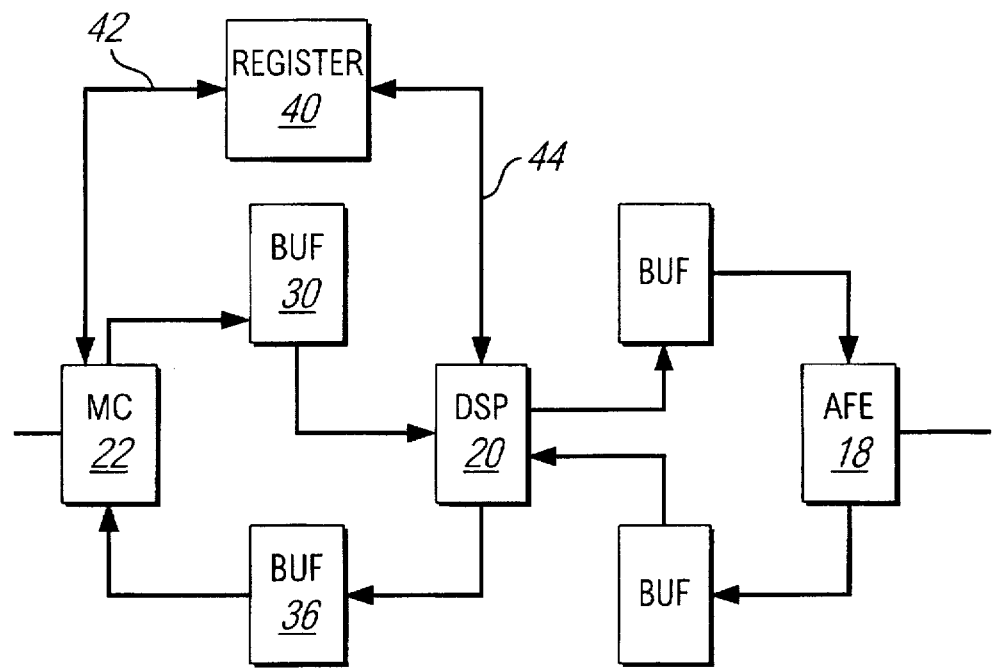
FIG. 4 is a block diagram of the logic needed to implement the present invention.

FIG. 4 is a block diagram of the logic needed to implement the present invention. Referring now to FIG. 4, the present invention may be accomplished by providing a separate register or memory location 40 that counts the symbols in buffer 30. Register 40 communicates with microprocessor 22 via data path 42 and with DSP 20 via data path 44. As a symbol is added to buffer 30 by microprocessor 22, register 40 is incremented by a signal sent by microprocessor 22 over data path 42. As a block of symbols is taken from buffer 30 by DSP 22, register 40 is decremented by a signal sent by DSP 20 over data path 44. Thus at any point in time, register 40 contains a count of the symbols in buffer 30.

Figure 5:
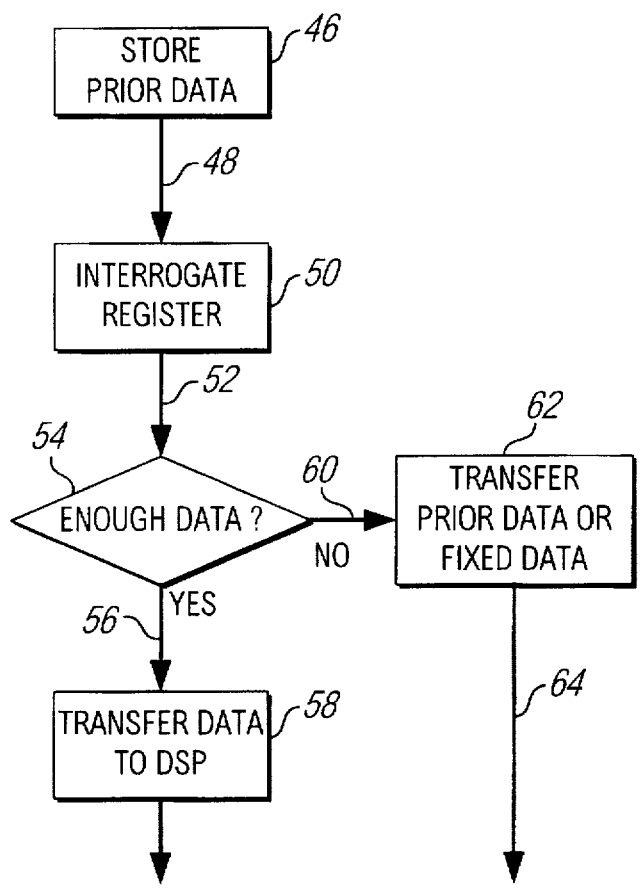
FIG. 5 is a flow chart of the logic needed for the present invention.

FIG. 5 is a flow chart of the logic needed to implement the present invention. In one preferred embodiment, the logic is implemented in DSP 20. Referring now to FIG. 5, after completing the conversion of a block of symbols to a block of samples, the block of samples is stored in temporary storage associated with DSP 20. This step is indicated by processing block 46. Next, follow process path 48 to processing block 50. In processing block 50, when DSP 20 is ready to process more data, logic in DSP 20 reads the contents of register 40 in FIG. 4. From step 50, follow process path 52 to decision block 54 where the contents of register 40 is compared with a predetermined number present in the logic of DSP 20. The predetermined number represents the minimum size block of symbols that will allow DSP 20 to supply sufficient samples to AFE 18 to maintain a connection with the receiving modem. This is typically 256 symbols. If the comparison indicates that there are sufficient symbols in buffer 30, follow process path 56 to processing block 58 and transfer the data in buffer 30 to DSP 20. If the comparison made at decision block 54 indicates that the minimum size block of symbols are not present in buffer 30, then follow process path 60 to processing block 62 and send to AFE 18 a predetermined pattern of data as a substitute for block of samples that should have been provided. The predetermined pattern of data may be identical to the last block sent which was saved at process step 46. Alternatively, the predetermined pattern of data may be a fixed values such as all ones. The logic in DSP 20 may be hard wired, but more typically would be microcode.

If the prior data or a fixed set of data is sent, the error correction schemes located in the microprocessor of the receiving modem will detect the error. For example, typical modem error detection and correction protocols use an encoding process such as HDLC to encode data so that errors introduced between the transmitter and receiver can be detected. In the transmitting mode, data is separated into frames, typically 128 or 256 bytes in length. Special characters are added to the frame to identify its beginning and end. The value of each character in the frame is summed and the result is divided by some number such as 255. The result is called a checksum. The checksum is sent with the frame. The receiving modem then performs the same calculation on the received frame and matches the results with the transmitted checksum. In the case where there are insufficient symbols in buffer 30, DSP 22 sends the substitute block of samples, but these samples do not have a checksum. Since no checksum is sent with the clock of data, the checksum calculated at the receiving modem will necessarily be different. A checksum error is detected, and an automatic repeat request is invoked. The transmitting modem will then resend the frame with the checksum error. Typically, microprocessor 22 will have provided sufficient symbols to buffer 30 by the time that the frame is to be retransmitted, and the correct data will be transmitted. If by chance, buffer is still short of symbols, the process of FIG. 5 is repeated.

Figure 1:
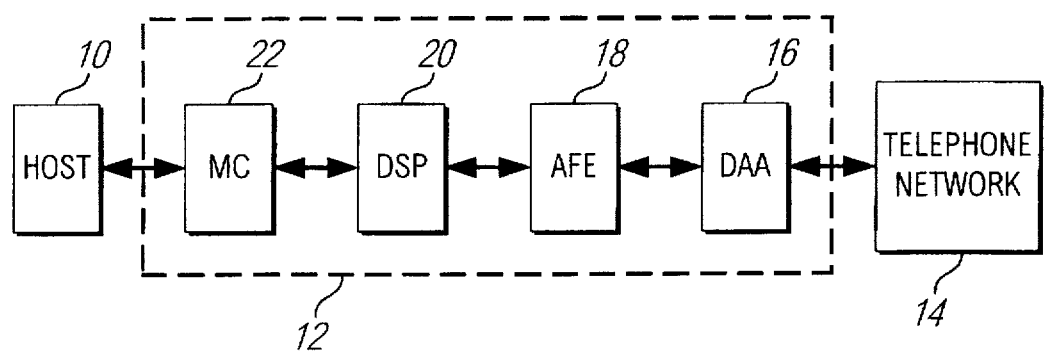
FIG. 1 is a block diagram of a typical high performance modem.
Figure 2:
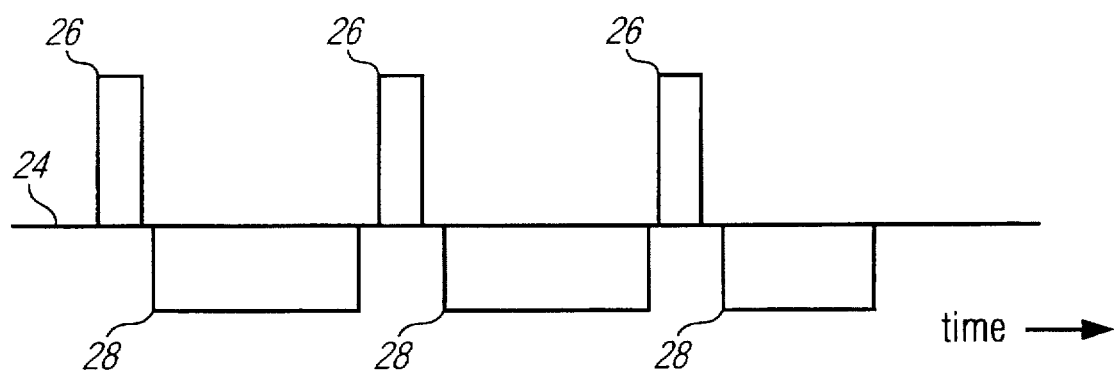
FIG. 2 is a time line showing how the logic of the DSP of a high performance modem deals with samples.
Figure 3:
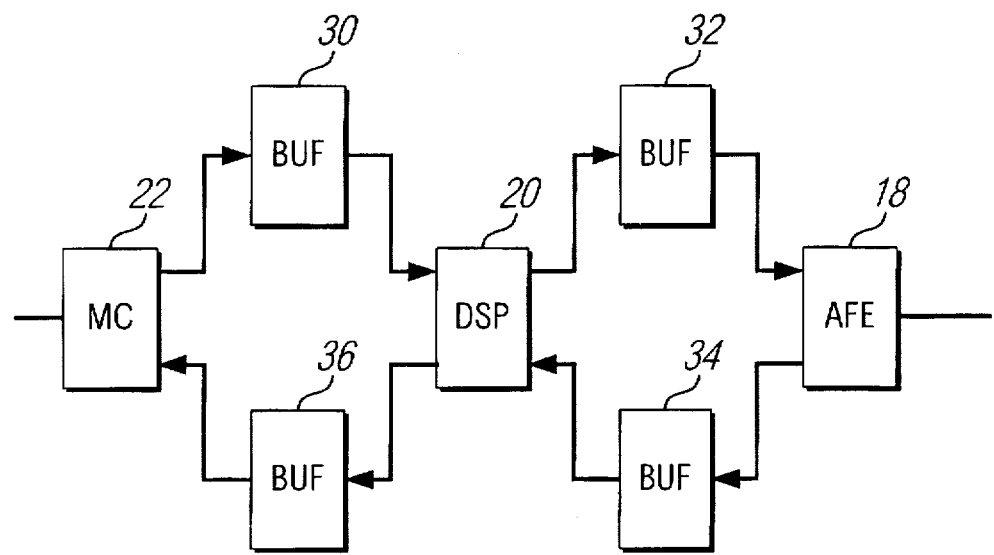
FIG. 3 is a block diagram illustrating the system enhancements required to perform block processing.
Figure 6:
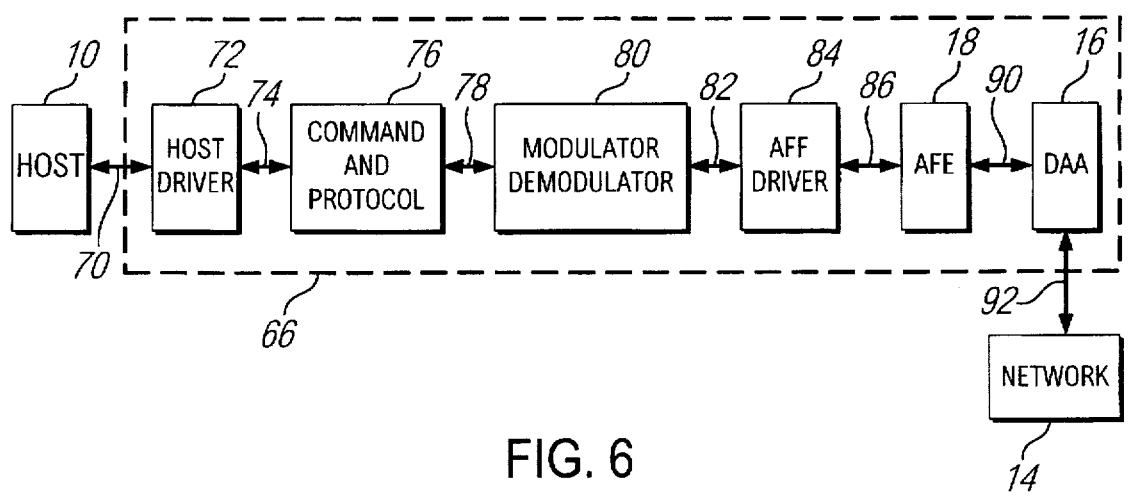
FIG. 6 is a block diagram of an alternative embodiment of the present invention.

FIGS. 1, 3 and 4 show a modem implemented with separate components, each of which may be comprised of both hardware and software. While the invention is best understood when described in this context, it is possible to implement the functions of microprocessor 22 and DSP 20 entirely in software. FIG. 6 is a block diagram illustrating an embodiment of the present invention where the modem is implemented in this manner. That is, the functions referenced with respect to microprocessor 22 and DSP 20 of FIG. 1 are software tasks running under a real-time operating system. Components in FIGS. 1, 4 and 6 with common reference numbers refer to the same component. The remaining functions of FIG. 6 are implemented as described in connection with FIG. 1. A real-time operating system provides a standardized means for managing the priority of separate threads of program execution, messaging conventions for the transfer of data and signaling of event occurrences between tasks. The messaging convention for the transfer of data is referred to as a stream. Reduced dependence on specific hardware implementations is achieved by isolating the hardware specific software components into specialized tasks called drivers. Software implementations of modem functions are well known and often used where the microprocessor is not dedicated.

Referring now to FIG. 6, host 10 is typically a computer, and is connected either electrically or by a messaging convention to host driver 72 of modem 66. The connection is shown as data path 70. Host driver 72 provides isolation of host specific implementation details and is connected by real-time operating system streams 74 to command and protocol tasks 76. Command and protocol tasks block 76 performs the protocol, error checking, and compression functions as well as general supervisory functions. These are the same functions that were performed by microprocessor 22 in FIGS. 1, 3 and 4. Command and protocol tasks block 76 is connected by real-time operating system streams 78 to modulator/demodulator ("mod/demod") tasks block 80.

Mod/demod functional block 80 performs the digital signal processing functions of modem 66. These are the same basic tasks that were performed by DSP 20 in FIGS. 1, 3 and 4. Tasks block 80 is connected by real-time operating system streams 82 to AFE driver 84. AFE driver 84 provides isolation of AFE 18 hardware-specific implementation details and is connected by data path 86 to AFE 18. AFE 18 is connected electrically by data path 90 to DAA 16 and DAA 16 is connected to telephone network 14 by data path 92.

In the embodiment of FIG. 6, block processing is always used since the overhead to switch between tasks is greater than that of servicing the interrupts. Buffers 30, 32, 34 and 36 of FIG. 3 are replaced by real-time operating streams 78 and 82 in FIG. 6. That is, since all tasks referenced in blocks 76 and 80 are running under software on a computer having memory, the buffering of samples and symbols is done in memory locations under control of the real-time operating system.

The software tasks execute only those specific operations which are directly applicable to achieving the results specified by the task. For example, a task does not examine hardware registers or pointers or monitor the condition of data buffers. Instead, each task makes operating system calls and the operating system performs these functions. For example, the availability of data from another task is done through an operating system call. The task will not execute until the expected event, for example availability of data, occurs. A task which is waiting for an event before commencing execution is said to be blocked.

In operation, when a user wishes to send data out over modem 66, application software running in host 10 sends that data over data path 70 to host driver 72. Host driver 72 immediately transmits the data over data path 74 to command and control task software 76 where the data is compressed, converted into symbols and configured for error correction. Mod/demod task 80 converts each block of symbols into a block of samples. The block of samples are sent to AFE driver 84 over data path 82. AFE driver 84 passes the block of samples over data path 86 to AFE 18 where the samples are converted to analog signals and passed over data path 90 to DAA 16 and then to telephone network 14.

When AFE 18 has completed conversion of the current block of samples, it initiates a data exchange through data path 86. AFE driver 84 completes the transaction by exchanging data with AFE 18 and in turn initiates a data exchange from mod/demod tasks in stream 82.

The mod/demod task of block 80 now initiates a data exchange in stream 78 from command and protocol tasks block 76. Again, the problem occurs when command and protocol task 76 is unable to complete this exchange on schedule. If the mod/demod task does not receive its block of symbols from command and protocol tasks 76 on schedule, it will not be ready to complete the exchange with AFE driver 84 which in turn will not be ready to complete the exchange with AFE hardware 18. As a result, no samples are converted by AFE 18 and no signal is sent to DAA 16. The result is a loss of carrier signal to the telephone network and the outcome is the same as described previously.

This problem is solved in the software implementation by defining a sequence of events analogous to those in the first embodiment. Referring again to FIG. 6, when mod/demod task 80 is ready to initiate a data exchange in stream 78, instead of making a call which will block until the exchange is completed, it will make an alternative call that does not block. Instead, an internal software routine will be executed which follows the logic of FIG. 5. In this method, command and protocol tasks 66 will transfer the quantity of data that it has available. If a sufficient quality of data is not available, mod/demod task 80 having maintained a copy of the previous block of data, will transfer that block of symbols to AFE driver 84, or set that block of data to a fixed pattern and transfer it to AFE driver 84. In either case, the mod/demod task will complete execution of that data and stand by for the next exchange of data with AFE driver 84. Again, the error correction software will identify the data as an error and request a retransmission.

While the present invention has been particularly described with reference to the various figures and embodiments, it should be understood that these are for illustration only and should not be taken as limiting the scope of the invention. Many changes and modifications may be made to the invention, by one having ordinary skill in the art, without departing from the spirit and scope of the invention.

What is claimed is:

1. In a system of block processing modems communicating across a telephone network wherein each modem has command and protocol tasks communicating with mod/ demod tasks which in turn communicate with an AFE and storage means communicating with said command and protocol tasks and said mod/demod tasks for temporary storage of data being communicated between said tasks, said system comprising:

data threshold indicator means communicating with said command and control protocol tasks and said mod/demod tasks for providing an indication that the amount of data stored in said temporary storage means is below a predetermined level;

data pattern output means communicating with said mod/demod tasks and responsive to said indication for causing said mod/demod tasks to provide a predetermined pattern of data output to said AFE upon receipt of said indication.

2. The system of claim 1 wherein said predetermined pattern of data output is a fixed pattern.

3. The system of claim 1 wherein said predetermined pattern of data output is substantially the same as a prior pattern of data output.

4. The system of claim 3 wherein said mod/demod tasks are run by a DSP; and said control and protocol tasks are run by a microprocessor.

5. The system of claim 4 wherein said storage means comprises a buffer located between said microprocessor and said DSP in the transmit data path; and said indicator means comprises a register communicating with said DSP and said microprocessor.

6. The system of claim 1 wherein said control and protocol tasks and said mod/demod tasks run under a realtime operating system.

7. The system of claim 1 wherein said storage means is computer memory.

8. The system of claim 1 wherein said indicator means is computer memory and counting code running under a real-time operating system.

9. The system of claim 1 wherein said command and protocol tasks include error checking means capable of detecting subsequent changes in data.

10. The system of claim 1 wherein said data pattern output means comprises:

means for storing a prior pattern of data output;
means for reading the value of said indication;
means for comparing the value of said indication with a predetermined value; and
means for causing a predetermined data pattern to be transferred to said AFE when said value of said indication is less than said predetermined value.

11. An under recovery system for block processing modems communicating across a telephone network wherein each modem includes a microprocessor, DSP and an AFE and with a first buffer connected between said microprocessor and said DSP in the transmit path a second buffer connected between said DSP and said AFE in the transmit path, a third buffer connected between said microprocessor and said DSP in the receive path a fourth buffer connected between said DSP and said AFE in the receive path, said system comprising:

memory for temporary storage;
a register communicating with said DSP and said microprocessor for measuring the quantity of data in said first buffer, said register being adapted to provide an indication of the quantity of data in said first buffer;
logic located in said DSP and responsive to said register indication, said logic means being adapted to compare said indication with a predetermined value and to cause said DSP to supply predetermined pattern of data output to said second buffer when said indication is less than said predetermined value.

12. The system of claim 11 wherein said logic includes:

means for storing a prior pattern of data output;
means for reading the value of said indication;
means for comparing said value of said indication with said predetermined value; and
means for causing a predetermined data pattern to be transferred to said AFE when said value of said indication is less than said predetermined value.

13. The system of claim 11 wherein said predetermined pattern of data output is a fixed pattern.

14. The system of claim 11 wherein said predetermined pattern of data output is substantially the same as a previous pattern of data output.

15. A method for maintaining a telephone network connection between a transmitting block processing modem and a receiving block processing modem, each modem having command and protocol tasks communicating with mod/demod tasks which in turn communicate with an AFE which communicates with said telephone network and having data storage means communicating with said command and protocol tasks and said mod/demod tasks for temporary storage of data being transferred between said tasks and indicator means communicating with said command and control protocol tasks and said mod/demod tasks for providing an indication that the amount of data stored in said temporary storage means is below a predetermined level, the steps comprising:

determining the quantity of data in said data storage means;
comparing said quantity with a predetermined value;
if said quantity exceeds said predetermined value; supplying the contents of said data storage means to said mod/demod tasks; and
if said quantity is less than said predetermined value, supplying a predetermined pattern of data to said AFE.

16. The method of claim 15 wherein said predetermined pattern of data is a fixed pattern.

17. The method of claim 15 wherein said predetermined pattern of data is data previously supplied to said AFE.

18. The method of claim 15 further including the step of detecting receipt of said predetermined data at said receiving modem; and said receiving modem sending a request for a retransfer of said the received data.

19. A modem communication system comprising, in combination:

a command and protocol task;
a mod/demod task communicating with said command and protocol task;
an Analog Front End ("AFE") communicating with said mod/demod task;
buffers for storing data communicated between each said task;
a storage element for providing an indication that the amount of data stored in said buffer between said command and protocol task and said mod/demod task is below a predetermined level; and
a predetermined data pattern communicated by said mod/demod task to said AFE upon receipt of said indication.

20. The modem communication system as claimed in claim 19 wherein said predetermined data pattern is a fixed pattern.

21. The modem communication system as claimed in claim 19 wherein said predetermined data pattern is substantially the same as the previous pattern of data output to said AFE.

22. The system as claimed in claim 19 wherein said mod/demod tasks are run by a DSP, and said control and protocol tasks are run by a microprocessor.

23. The system as claimed in claim 19 wherein said control and protocol tasks and said mod/demod tasks run under a realtime operating system.

24. The system as claimed in claim 19 wherein said buffers and said register comprise RAM within a computer system.

25. A method for operating block processing modems communicating across a telephone network wherein each modem has command and protocol tasks communicating with mod/demod tasks which in turn communicate with an Analog Front End ("AFE"), said method comprising the steps of:

allocating a buffer for storing data communicated between each said task;

allocating storage for an indication that the amount of data stored in said buffer between said command and protocol task and said mod/demod task is below a predetermined level; and providing a predetermined data pattern communicated by said mod/demod task to said AFE upon receipt of said indication.

26. The method as claimed in claim 25 wherein said predetermined data pattern is a fixed pattern.

27. The method as claimed in claim 25 wherein said predetermined data pattern is substantially the same as the previous pattern of data output to said AFE.

28. The method as claimed in claim 25 wherein said mod/demod tasks are run by a DSP, and said control and protocol tasks are run by a microprocessor.

29. The method as claimed in claim 25 wherein said control and protocol tasks and said mod/demod tasks run under a realtime operating system.

30. The method as claimed in claim 25 wherein said buffers and said register comprise RAM within a computer system.

* * * * *